United States Patent [19]
Leoni

[11] 3,908,513
[45] Sept. 30, 1975

[54] SERVO JAM BY-PASS LINKAGE

[75] Inventor: Ray Dennis Leoni, Woodbridge, Conn.

[73] Assignee: United Technologies Corporation, East Hartford, Conn.

[22] Filed: Mar. 11, 1974

[21] Appl. No.: 450,131

[52] U.S. Cl. .............................. 91/384; 91/391 R
[51] Int. Cl.² ...................... F15B 9/10; F15B 13/10
[58] Field of Search ................ 91/391 R, 384; 64/24

[56] References Cited
UNITED STATES PATENTS

| | | | |
|---|---|---|---|
| 2,503,956 | 4/1950 | Lisle et al. | 91/391 R |
| 2,551,273 | 5/1951 | Lisle et al. | 91/391 R |
| 2,566,273 | 8/1951 | Westbury | 91/391 R |

*Primary Examiner*—Paul E. Maslousky
*Attorney, Agent, or Firm*—Russell M. Lipes, Jr.

[57] ABSTRACT

A shear pin and linkage assembly for a hydraulic boost servo in an aircraft flight control system which provides for actuation of the control system in the event of a jam of the servo.

7 Claims, 2 Drawing Figures

SERVO JAM BY-PASS LINKAGE

The invention herein described was made in the course of or under a contract or subcontract thereunder with the U.S. Army Aviation Systems Command.

BACKGROUND OF THE INVENTION

1. Field of the Invention

This invention relates to aircraft flight control systems and more particularly to a control system which would be operable even if a hydraulic boost servo in the system became jammed due to failure or projectile damage.

2. Description of the Prior Art

In aircraft, every attempt is made to insure fail-safe operation of the control systems. Particularly in aircraft used in warfare, the control system is designed so as to minimize the damaging effect of hits by shell fragments, bullets, rockets and other projectiles. Prior efforts to provide control systems which will assure some degree of aircraft control even though a hydraulic servo might jam or the control system has been damaged by gun or rocket fire include the use of a backup system, and the use of armor plating to shield sensitive structures. For the most part, these alternatives impose a cost-weight penalty, or increased complexity.

Prior art patent teachings such as Pearsall, Jr., et al. U.S. Pat. No. 2,389,274, Lisle et al. U.S. Pat. No. 2,551,273, Christensen U.S. Pat. No. 2,819,030, Smith et al. U.S. Pat. No. 2,823,897 and Elmer et al. U.S. Pat No. 3,011,482 are directed to hydraulic boost or power servos for aircraft control systems and have a direct manual backup system which is operative upon a failure in the hydraulic system.

SUMMARY OF THE INVENTION

An object of this invention is to provide an improved aircraft control system.

Another object of the invention is to provide an aircraft control system affording improved protection against jamming of a hydraulic boost servo due to failure or damage from enemy gun and rocket fire.

Still another object of the invention is to provide an aircraft control system having elements which insure operation of the aircraft even though one or more hydraulic servos has jammed or been damaged.

In accordance with the invention, a boost servo actuator in an aircraft control system has an input and an output which are connected to the boost servo through links comprising two portions which normally are united by a shear pin. Upon jamming of the servo, pilot force can shear the shear pins so that the control system input can bypass the servo and act through a bypass linkage to actuate the control system output.

The foregoing and other objects, features and advantages of the invention become more apparent in the light of the following detailed description of a preferred embodiment thereof, as illustrated in the accompanying drawing.

DESCRIPTION OF A PREFERRED EMBODIMENT

Figure 1:
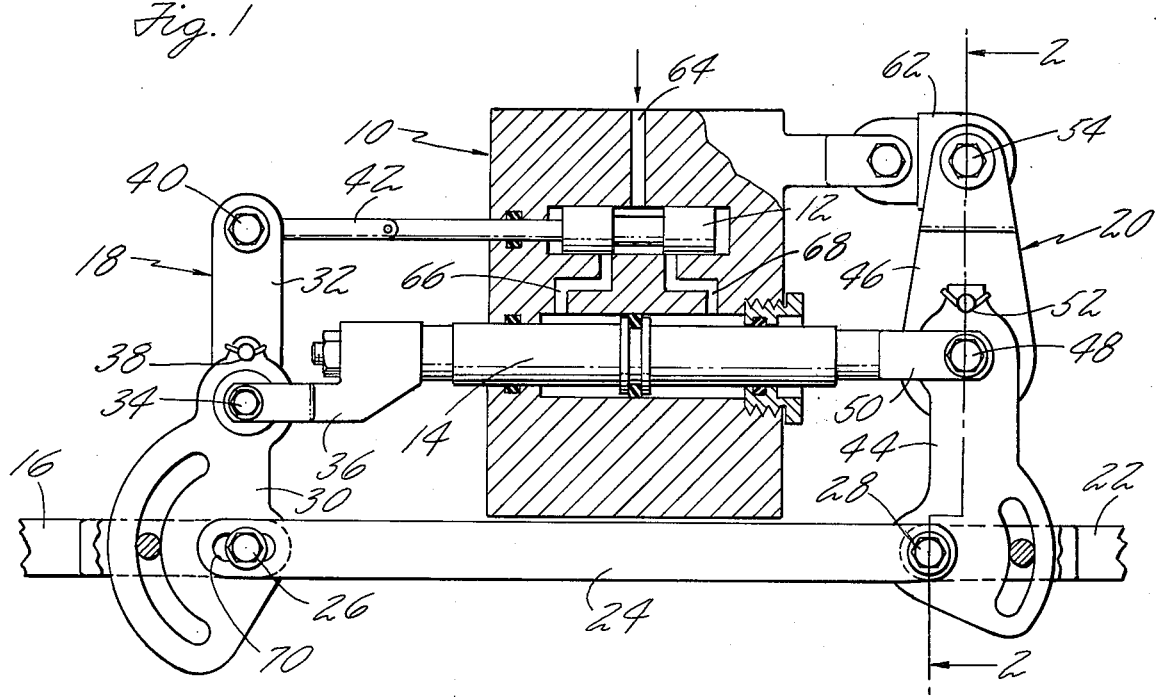
FIG. 1 is a view in partial section of a hydraulic servo and its associated linkage system constructed in accordance with this invention.

Referring to FIG. 1, hydraulic boost servo 10 is shown having pilot valve 12 and power piston 14. Input rod 16, part of a control system, is pivotably connected through input lever assembly 18 to the pilot valve and power piston, and the power piston is pivotably connected through output lever assembly 20 to output rod 22. The connection of the input and output rods to their respective lever assembly is in accordance with the ballistically tolerant bellcrank/rod-end structure disclosed and claimed in copending application Ser. No. 424,987 filed Dec. 14, 1973 now U.S. Pat. No. 3,842,687 issued Oct. 22, 1974.

Redundant link 24 connects the input and output rods directly, bypassing servo 10 in a manner to be explained. Input rod 16 and the left end of redundant link 24 are pivotably connected to the lower end of input lever assembly 18 by bolt 26, and output rod 22 and the right end of redundant link 24 are pivotably connected to the lower end of output lever assembly 20 by bolt 28.

Figure 2:
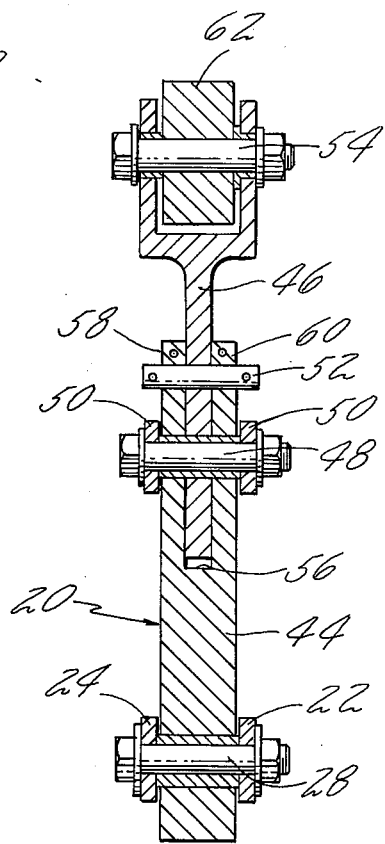
FIG. 2 is a section view of the output lever assembly along line 2—2 in FIG. 1.

Input lever assembly 18 includes lever 30 forming the lower portion of the assembly and upper lever 32 forming the upper portion. The two levers pivot about bolt 34 connecting the mid-portion of the lever assembly to clevis 36 which is integral with power piston 14. Lever 30 and upper lever 32 are secured together by shear pin 38 to rotate about bolt 34 as a unitary structure. The construction is similar to that of output lever assembly 20 which is illustrated in FIG. 2 and which will be explained in more detail. The upper end of input lever assembly 18 is pivotably connected by bolt 40 to stem 42 which is integral with pilot valve 12.

Output lever assembly 20 includes lever 44 forming the lower portion of the assembly and upper lever 46 forming the upper portion. The two levers pivot about bolt 48 connecting the mid-portion of the lever assembly to clevis 50 on power piston 14. Lever 44 and upper lever 46 are secured together by shear pin 52 to rotate about bolt 48 as a unitary structure. The upper end of output lever assembly 20 has a relatively fixed pivot at bolt 54 about which the lever assembly normally rotates in response to movement of power piston 14.

FIG. 2 is a sectional view through output lever assembly 20 along line 2—2 in FIG. 1. Lever 44 is slotted at its upper end for receiving the lower end of upper lever 46. Slot 56 in lever 44 contains upper lever 46 between projections 58 and 60. The two levers are secured together by shear pin 52 which passes through projections 58 and 60 and the upper lever. The lever assembly is capable of rotation about bolt 48 which also passes through the two projections and the upper lever as well as clevis 50 on the power piston, and the two levers comprising the lever assembly can rotate independently about bolt 48 upon movement of power piston 14 after pin 52 has been sheared. The upper end of upper lever 46 is Y-shaped for connection by bolt 54 to base structure 62 which may be adjustable.

Shear pin 38 in the input lever assembly is smaller in diameter than shear pin 52 in the output lever assembly because the pins are designed for different loads. Pin 52 is larger because it must react the normal operating load of power piston 14. In the embodiment shown, servo 10 is a low output pilot-assist servo which does not react flight loads. By way of example, input shear pin 38 is designed to shear under a loading of about 150 pounds, and output shear pin 52 is designed to shear under a loading of about 600 pounds. If, through the control system linkage, the pilot has a mechanical advantage of five, pin 38 will shear at a cockpit force of 30 pounds and pin 52 will shear at a cockpit force of 120 pounds, both forces being within a pilot's physical capability.

In normal operation, movement of input control rod 16 causes rotation of input lever assembly 18 about bolt 34, the connection of the lever assembly with power piston 14 which at the instant is in a fixed position. Rotation of lever assembly 18 causes movement of pilot valve 12, admitting hydraulic fluid from passage 64 through either passage 66 or passage 68 to one side or other of power piston 14. Slot 70 in redundant link 24 permits limited relative movement of the input lever assembly and bolt 26, connecting input rod 16 and lever assembly 18, with respect to the redundant link. Movement of power piston 14 resulting from fluid flow to one side or the other of the piston rotates input lever assembly 18 about bolt 26 and moves pilot valve 12 back to its null position. At the same time, the movement of the power piston rotates output lever assembly about bolt 54 to move output control rod 22 in accordance with the originating movement of rod 16.

In the event that power piston 14 or pilot valve 12 is jammed due to a malfunction or damage, and the rotation of input lever assembly 18 as a unit is limited, the pilot can exert sufficient force to shear pin 38. When this happens, lever 30 is free to rotate about bolt 34 independently of upper lever 32. Movement of input rod 16 and lever 30 than is imparted, once travel of bolt 26 in slot 70 is limited, to redundant link 24 and output lever assembly 20. Since the output lever assembly is essentially fixed in position by the disablement of power piston 14 or pilot valve 12, application of additional force by the pilot will shear pin 52. This will free lever 44 so that the motion of redundant link 24 can rotate it about bolt 48 and impart motion to output rod 22. By virtue of this construction, at least limited actuation of the control system including rods 16 and 22 is possible in the event that boost servo 10 is rendered inoperative.

Although the invention has been shown and described with respect to a preferred embodiment thereof, it should be understood by those skilled in the art that the foregoing and other changes and omissions in the form and detail thereof may be made therein without departing from the spirit and scope of the invention, which is to be limited and defined only as set forth in the following claims.

I claim:
1. In an aircraft control system,
a hydraulic servo,
a control system input to said servo, and
a control system output from said servo,
first lever means between said control input and said servo and second lever means between said control output and said servo,
said first and second lever means each including a pair of levers having a common pivot point,
means directly connecting said control input and said control output,
and means associated with said first and second lever means including pins shearable upon the application of a control system input force for effecting control system operation through said directly connecting means upon jamming of said servo.

2. An aircraft control system according to claim 1 in which the first lever means shear pin shears at a different and higher force than the second lever means shear pin.

3. An aircraft control system according to claim 1 in which said servo has a power piston and the common pivot point is connected to said power piston.

4. An aircraft control system according to claim 1 in which the directly connecting means has a lost motion connection with said control input.

5. A hydraulic servo system having
a pilot valve and
a power piston,
a first link connecting said pilot valve and said power piston.
a second link having a common connection with said first link at said power piston connection,
said second link having input means connected thereto,
means joining said first and second links for unitary operation and providing capability for independent operation,
a third link connecting a relatively fixed pivot and said power piston,
a fourth link having a common connection with said third link at said power piston connection,
said fourth link having output means connected thereto,
means joining said third and fourth links for unitary operation and providing capabiity for independent operation,
and a fifth link connecting said second and fourth links.

6. A hydraulic servo system in accordance with claim 5 in which said fifth link has a lost motion connection with said second.

7. A hydraulic servo system in accordance with claim 6 in which each said link joining means is a shear pin.

* * * * *